United States Patent
Draper et al.

(10) Patent No.: US 7,584,348 B1
(45) Date of Patent: Sep. 1, 2009

(54) TECHNIQUES FOR CONFIGURING AN EMBEDDED PROCESSOR OPERATING SYSTEM

(75) Inventors: Andrew Draper, Chesham (GB); Iain Scott, Witney (GB); Paul Riley, Burnham (GB)

(73) Assignee: Altera Corporation, San Jose, CA (US)

( * ) Notice: Subject to any disclaimer, the term of this patent is extended or adjusted under 35 U.S.C. 154(b) by 525 days.

(21) Appl. No.: 11/262,120

(22) Filed: Oct. 28, 2005

(51) Int. Cl.
*G06F 15/177* (2006.01)
(52) U.S. Cl. .......................................... 713/1; 713/100
(58) Field of Classification Search ...................... 713/1, 713/2, 100
See application file for complete search history.

(56) References Cited

U.S. PATENT DOCUMENTS

| | | | |
|---|---|---|---|
| 5,850,539 A * | 12/1998 | Cook et al. | 703/20 |
| 6,192,470 B1 * | 2/2001 | Kelley et al. | 713/1 |
| 6,253,318 B1 * | 6/2001 | Varghese et al. | 713/1 |
| 6,263,382 B1 * | 7/2001 | Bartlett et al. | 710/10 |
| 6,353,884 B1 * | 3/2002 | Schmitz et al. | 713/1 |
| 6,477,683 B1 * | 11/2002 | Killian et al. | 716/1 |
| 6,543,047 B1 * | 4/2003 | Vrhel et al. | 717/121 |
| 6,829,703 B1 * | 12/2004 | Caswell et al. | 713/1 |
| 6,952,767 B1 * | 10/2005 | Tanaka | 713/100 |

OTHER PUBLICATIONS

Massa, Anthony J.; "eCos Porting Guide"; 2001, http://www.embedded.com/showArticle.jhtml?articleID=15201698, 10 pages.

* cited by examiner

*Primary Examiner*—Chun Cao
(74) *Attorney, Agent, or Firm*—Townsend and Townsend and Crew LLP

(57) ABSTRACT

An operating system for a processor in a hardware device is configured by reading data defining a configuration of the hardware device. Based on the defined configuration of the hardware device, it is determined which operating system configuration options, from a plurality of available operating system configuration options, are valid. Then, only the valid operating system configuration options are presented to a user. The hardware device may be a fixed hardware platform, or may be a configurable hardware device such as an FPGA. The data defining the configuration of the hardware device can be read from a high level design entry tool.

21 Claims, 2 Drawing Sheets

TECHNIQUES FOR CONFIGURING AN EMBEDDED PROCESSOR OPERATING SYSTEM

BACKGROUND OF THE INVENTION

This invention relates to a computer processor operating system, in particular for use in an electronic device including an embedded processor, and to a method of operation of such an operating system.

When designing a computer system, the processor operating system is an essential component of the overall system. The operating system manages all the basic functions of the computer, in that it deals with scheduling tasks, managing storage, and handling communication with peripherals. As a result, the operating system needs to be configured in a way that depends on the availability of such storage and peripherals.

Various operating systems are well known to the person skilled in the art, and it is known that a selected operating system needs to be configured for the particular hardware with which it is to be used. An operating system therefore typically includes a board support package. Specifically, the known board support package assists the user to configure the operating system as required, by presenting the user with a list of available options for various parameters of the system. The board support package then configures the operating system, based on the options selected by the user from the list of available options.

One available operating system is the eCos operating system, and a description of the process of porting the operating system to the particular hardware, can for example be found in the document "eCos Porting Guide", available at www.embedded.com/story/OEG20011220S0059. In this document, the board support package is referred to as a Hardware Abstraction Layer (HAL).

One type of system in which an operating system needs to be configured based on the hardware in use is a system which includes a configurable hardware device. For example, in the case of a Field Programmable Gate Array, logic resources on a device can be configured in such a way that they perform specific desired functions. Such devices may also include an embedded processor, so that particular functions can be performed more efficiently. In order to assist the user to configure such devices most efficiently, it is known to provide a software tool for that purpose.

For example, the SOPC Builder software tool, available from Altera Corporation, allows a user to specify desired components of a final device and the connections between those components, and then creates the configuration data that cause the logic resources of the configurable hardware device to create those specified components and interconnections.

SUMMARY OF THE INVENTION

According to the present invention, an operating system for a processor in a hardware device is configured by reading data defining a configuration of the hardware device. Based on the defined configuration of the hardware device, it is determined which operating system configuration options, from a plurality of available operating system configuration options, are valid. Then, only the valid operating system configuration options are presented to a user.

This has the advantage that the configuration of the operating system becomes easier for the user, as it is not necessary to select options which are in fact already defined by the configuration of the hardware device.

The hardware device can be a configurable hardware device, that is, its configuration can be changed, or it can be hardware device with a fixed configuration.

According to an aspect of the invention, there is provided a configurable hardware device having a processor with an operating system which communicates with a high level hardware design tool, and determines from that which options need to be presented to the user for selection of suitable parameters.

DETAILED DESCRIPTION OF PREFERRED EMBODIMENTS

Figure 1:
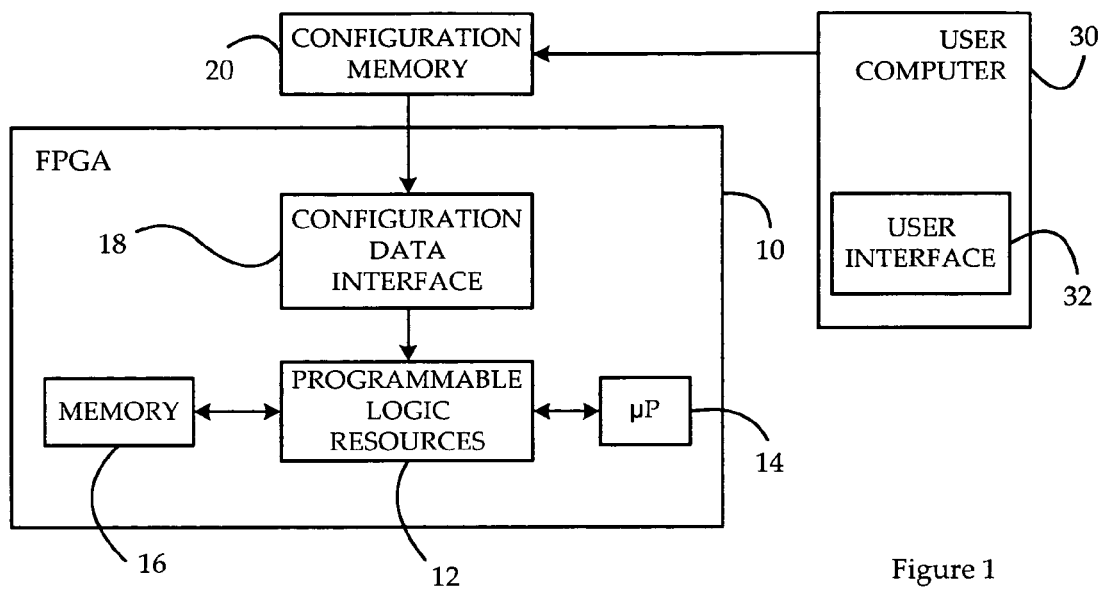
FIG. 1 is a block schematic diagram of a configurable hardware device in accordance with the present invention.

FIG. 1 shows a configurable hardware device, in the form of a Field Programmable Gate Array (FPGA) 10. As is conventional, the FPGA 10 includes programmable logic resources 12, in the form of logic elements, whose functions, and whose interconnections, are determined by configuration data supplied to the device. In this case, the FPGA 10 also includes an embedded microprocessor (µP) 14 and dedicated memory 16. Again, the connections between the logic elements amongst the programmable logic resources 12 on the one hand, and the microprocessor 14 and memory 16 on the other hand, are determined by the configuration data supplied to the device.

The configuration data are received at a configuration data interface 18. As illustrated in FIG. 1, the configuration data are received at the configuration data interface 18 from an external configuration memory 20, for example in the form of a separate flash memory device. The general form of the FPGA 10 will be known to the person skilled in the art, and so it will not be described further herein. For example, the FPGA 10 might take the form of a Stratix® device, available from Altera Corporation.

In order to cause the FPGA 10 to perform the required functionality, it is necessary to provide configuration data that enable the logic elements of the programmable logic resources 12 to perform the necessary functions, and that cause the intended interconnections between those logic elements, and with the microprocessor 14 and memory 16. Where the programmable logic resources are to be used fully, in order to cause the FPGA 10 to have relatively complex functionality, then a correspondingly large amount of configuration data needs to be supplied. The resulting configured device may be known as a System on a Programmable Chip (SOPC).

In order to assist a user of the device to supply this configuration data in a convenient way, it is known to provide the user with a design entry tool. For example, the design entry tool, suitable for use with the Stratix® device, mentioned above, might take the form of the SOPC Builder tool, available from Altera Corporation. The design entry tool runs on a user computer 30, which may be a PC, server, or other suitable computer system to which the configuration memory 20 can be connected.

The user computer 30 has a user interface 32, which may for example be a conventional combination of a display and a keyboard and mouse, and the design entry tool allows the user to select the component functional blocks that are intended to form part of the final system design. For example, the design entry tool may cause the user interface 32 to present the user with a list of devices, which can be implemented in the FPGA. Depending on the required functionality of the configured FPGA 10, the user can select the required devices, again by means of the user interface 32. For example, based on the external devices to which the configured FPGA 10 may be connected in use, the user is then able to select the interfaces that are required in a particular design.

Moreover, the design entry tool then causes the user interface 32 to present the user with various further options, allowing the user to select required parameter values for the selected components, and required interconnections between the components.

Based on these high level inputs, the design entry tool running on the user computer 30 is then able to generate suitable configuration data, such that, when transferred to the FPGA 10, the required interconnections of the logic elements amongst the programmable logic resources 12 are generated.

Figure 2:
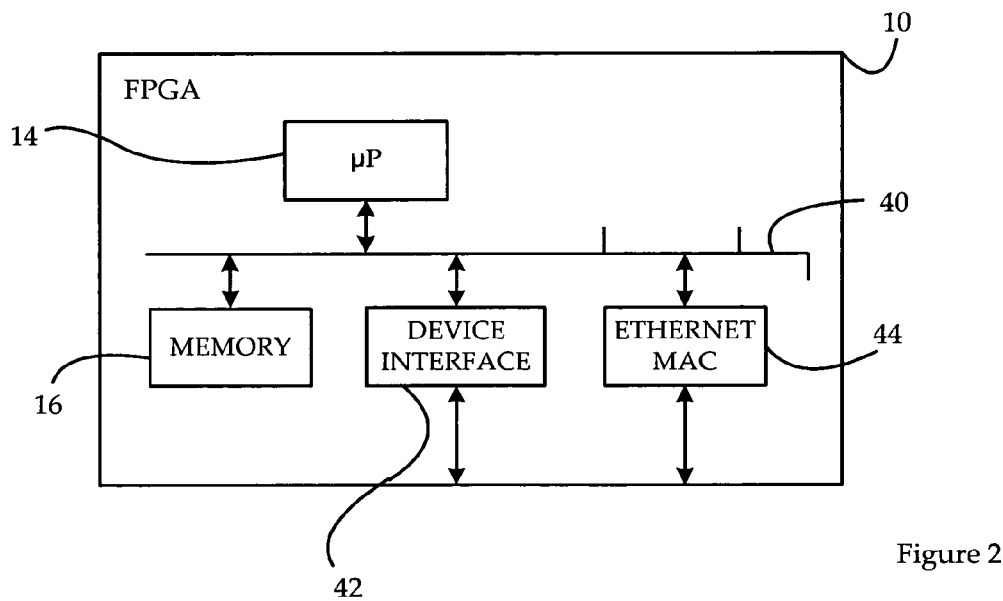
FIG. 2 is a further block schematic diagram of a configurable hardware device in accordance with the present invention.

FIG. 2 is a block schematic diagram showing the form of an example of a configured FPGA 10. As shown in FIG. 2, the embedded microprocessor (µP) 14 and dedicated memory 16 are shown as interconnected by a bus 40, which is defined by the functions and interconnections of the logic elements in the programmable logic resources 12.

The configured device 10 also includes other functional component blocks. For example, as shown in FIG. 2, the configured device 10 also includes a device interface 42, which may for example be able to connect to an external device such as an external memory device, or an external digital signal processor (DSP). Further, as shown in FIG. 2, the configured device 10 also includes an external interface 44, which may for example be an Ethernet Media Access Control (MAC) block, allowing the device 10 to connect to an Ethernet external network.

It will be appreciated that the configured device 10 may include many other functional component blocks, such as memory controllers, interrupt controllers, etc.

Each of these component functional blocks has its operating parameters determined by the configuration data supplied to the device 10, on the basis of the user entries to the design entry tool running on the user computer 30.

Figure 3:
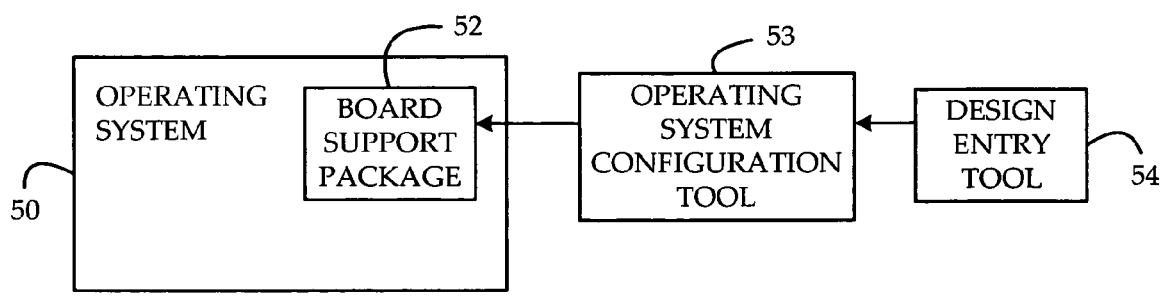
FIG. 3 illustrates the operation of software in accordance with the present invention.

FIG. 3 is a schematic representation of the software in use in the system. As mentioned above, the embedded processor 14 is provided with operating system software 50, which needs to be ported to the hardware in the system on first use. That is, the operating system needs to be configured to take account not only of the components of the configured device 10, but also of the other devices to which the device 10 is to be connected. For example, where, as shown in FIG. 2, the configured device 10 includes an external memory interface or other device interface, the porting of the operating system software 50 also needs to take account of the properties of those external components and devices. The operating system software 50 includes a board support package 52, which is the hardware dependent part of the operating system.

In order to assist the user in this porting process, there is provided an operating system configuration tool 53, which allows the user to select various configuration options for the board support package 52 of the operating system.

Further, as mentioned above, the user has access to a design entry tool 54, namely a software tool that receives user inputs specifying at a high level the required components of the configured device, and some of their operating parameters, and interprets these in order that the components can be correctly implemented in the programmable logic resources 12 of the FPGA 10.

Figure 4:
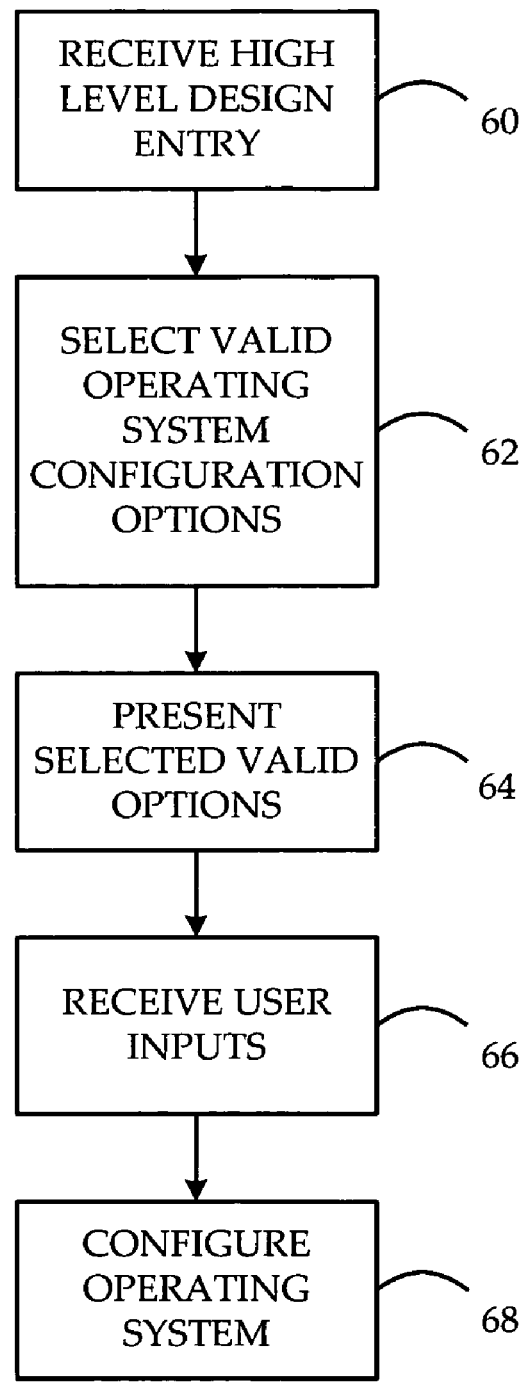
FIG. 4 is a flow chart illustrating a method in accordance with the present invention.

FIG. 4 is a flow chart illustrating the operation of the software shown in FIG. 3.

In step 60, the design entry tool software 30 receives the high level design entries from the user, specifying the required system components, and at least some of their operating parameters.

In step 62, the software selects from a large number of available operating system configuration options only those configuration options that are valid, based on these high level design entries.

As an example, we can consider the situation where the user specifies that the configured device 10 should include a serial device interface, for example for a UART interface. An interface of this type can either wait to receive an interrupt to indicate that data has arrived, or it can periodically poll the hardware.

Based on the decision regarding the interface, the operating system software 50 needs to be configured appropriately. For example, when the interface is interrupt driven, the size of the circular buffer used to receive characters needs to be defined, and the board support package 52 can for example present the user with a number of options for the buffer size, allowing him to select the desired size. The size of the circular buffer in the interface is therefore an available configuration option for the board support package.

Also, if the interface is interrupt driven, the device driver must be provided with an interrupt line in the configured hardware device 10, and so the design entry tool software 30 needs to obtain this information from the user at the design entry stage.

Therefore, if the design entry tool software 30 receives an input indicating that the interface is not intended to be interrupt driven, it can be determined in step 62 of the process that it is not necessary to define the size of the circular buffer in the interface. That is, this available configuration option is not valid when the device driver is interrupt driven.

In step 64, the board support package software 52 of the operating system 50 presents the user with a number of operating system configuration options. However, the board support package software 52 only presents the user with those operating system configuration options that have been determined to be valid, as described above with reference to step 62.

That is, based on the high level design entry, it can be determined which parameters need to have values selected by the user, and the user can be presented with appropriate configuration options. Further, where parameters can be uniquely defined, based on the high level design entry, then these configuration options do not need to be presented to the user as the required parameter values can be determined by the system.

In step 66, the board support package 52 receives the user inputs relating to the operating system configuration options that he wishes to choose. Since the user will have been presented only with the configuration options that have been determined to be valid, this process becomes simpler for the user.

In step 68, the board support package 52 causes the rest of the operating system 50 to be appropriately configured, based on the user's requirements.

There is therefore described a system that makes configuration of the operating system simpler for the user, by presenting only the valid configuration options, based on the hardware system description. Although the invention has been described with reference to an example of a configurable hardware device with an embedded processor, in which there is a high level design entry tool available that obtains a large amount of detail about the user's intended final hardware configuration, it is also applicable to other situations in which the user provides any information about a hardware configuration, as it is also possible in those situations to extract information about the validity of certain operating system configuration options, and determine whether to present those options to the user.

For example, the process of FIG. 4 can be applied to a high level design entry for a fixed hardware platform such as an ASIC (Application Specific Integrated Circuit) or a printed circuit board. In such a case, an operating system still needs to be configured for use with the hardware.

The invention claimed is:

1. A method of configuring an embedded operating system for a processor of an embedded hardware device, the method comprising:
   receiving data defining a configuration of the embedded hardware device from a high-level design tool, wherein the embedded hardware device includes said processor, wherein the data defining the configuration received from the high-level design tool comprises a set of functional blocks and interconnections between functional blocks, each functional block representing functionality to be implemented in the embedded hardware device, and wherein the high-level design tool provides an interface for selecting component functional blocks;
   based on the defined configuration of the embedded hardware device, determining which operating system configuration options, from a plurality of available operating system configuration options, are valid; and
   presenting only the valid operating system configuration options to a user.

2. A method as claimed in claim 1, wherein the data defining the configuration of the embedded hardware device is read from a hardware design entry tool.

3. A method as claimed in claim 1, wherein the embedded hardware device is a configurable hardware device.

4. A method as claimed in claim 3, wherein the configurable hardware device comprises programmable logic resources.

5. A method as claimed in claim 3, wherein the configurable hardware device is a FPGA.

6. A method as claimed in claim 1, wherein the embedded hardware device is a printed circuit board.

7. A method as claimed in claim 1, wherein the embedded hardware device is an ASIC.

8. A method as claimed in claim 1, comprising determining at least one first configuration option for which a parameter value is required, and presenting said first configuration option to said user for selection of a desired parameter value.

9. A method as claimed in claim 1, comprising determining at least one second configuration option for which a parameter value is required, determining a required parameter value based on the defined configuration of the embedded hardware device, and
   configuring said operating system based on said required parameter value without presenting said second configuration option to said user.

10. A method as claimed in claim 1, comprising determining at least one third configuration option which is unavailable based on the defined configuration of the embedded hardware device, and configuring said operating system without presenting said third configuration option to said user.

11. An operating system configuration tool, for configuring an embedded operating system in an embedded hardware device, wherein the configuration tool:
   receives data defining a configuration of the embedded hardware device from a high-level design tool, wherein the embedded hardware device includes said processor, wherein the data defining the configuration received from the high-level design tool comprises a set of functional blocks and interconnections between functional blocks, each functional block representing functionality to be implemented in the embedded hardware device, and wherein the high-level design tool provides an interface for selecting component functional blocks;
   based on the defined configuration of the embedded hardware device, determines which operating system configuration options, from a plurality of available operating system configuration options, are valid; and
   presents only the valid operating system configuration options to a user.

12. An operating system configuration tool as claimed in claim 11, wherein the embedded hardware device is a configurable hardware device.

13. An operating system configuration tool as claimed in claim 11, wherein the configuration tool receives data from a hardware design entry tool, determines at least one first configuration option for which a parameter value is required, and presents said first configuration option to said user for selection of a desired parameter value.

14. An operating system configuration tool as claimed in claim 11, wherein the configuration tool receives data from a hardware design entry tool, determines at least one second configuration option for which a parameter value is required, determines a required parameter value based on the defined configuration of the embedded hardware device, and configures said operating system based on said required parameter value without presenting said second configuration option to said user.

15. An operating system configuration tool as claimed in claim 11, wherein the configuration tool receives data from a hardware design entry tool, determines at least one third configuration option which is unavailable based on the defined configuration of the embedded hardware device, and configures said operating system without presenting said third configuration option to said user.

16. A configurable hardware device, comprising:
   an embedded processor;
   an input for receiving configuration data, such that a configuration of the configurable hardware device is determined by the received configuration data;
   embedded operating system software, comprising a board support package and a configuration tool, for configuring the operating system;
   wherein the configuration tool:
   receives data defining a configuration of the configurable hardware device from a high-level design tool, wherein the configurable hardware device includes said processor, wherein the data defining the configuration received from the high-level design tool comprises a set of functional blocks and interconnections between functional blocks, each functional block representing functionality to be implemented in the configurable hardware device, and wherein the high-level design tool provides an interface for selecting component functional blocks;

based on the defined configuration of the configurable hardware device, determines which operating system configuration options, from a plurality of available operating system configuration options, are valid; and presents only the valid operating system configuration options to a user.

17. A configurable hardware device as claimed in claim 16, wherein the configurable hardware device comprises programmable logic resources.

18. A configurable hardware device as claimed in claim 16, wherein the configurable hardware device is a FPGA.

19. A configurable hardware device as claimed in claim 16, wherein the configuration tool receives data from a hardware design entry tool, determines at least one first configuration option for which a parameter value is required, and presents said first configuration option to said user for selection of a desired parameter value.

20. A configurable hardware device as claimed in claim 16, wherein the configuration tool receives data from a hardware design entry tool, determines at least one second configuration option for which a parameter value is required, determines a required parameter value based on the defined configuration of the configurable hardware device, and configures said operating system based on said required parameter value without presenting said second configuration option to said user.

21. A configurable hardware device as claimed in claim 16, wherein the configuration tool receives data from a hardware design entry tool, determines at least one third configuration option which is unavailable based on the defined configuration of the configurable hardware device, and configures said operating system without presenting said third configuration option to said user.

* * * * *

UNITED STATES PATENT AND TRADEMARK OFFICE
CERTIFICATE OF CORRECTION

PATENT NO. : 7,584,348 B1 Page 1 of 1
APPLICATION NO. : 11/262120
DATED : September 1, 2009
INVENTOR(S) : Draper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this

Fourteenth Day of December, 2010

David J. Kappos
*Director of the United States Patent and Trademark Office*